UNITED STATES PATENT OFFICE.

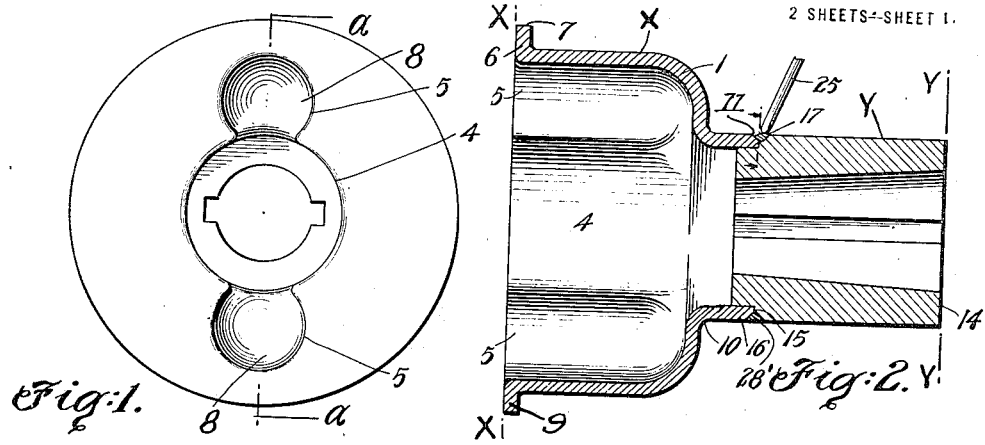
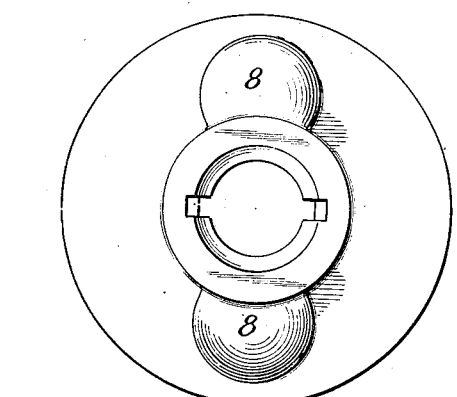
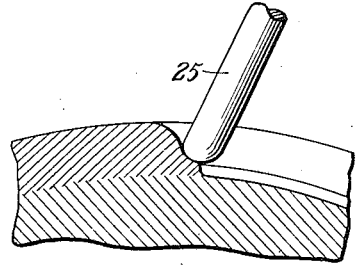
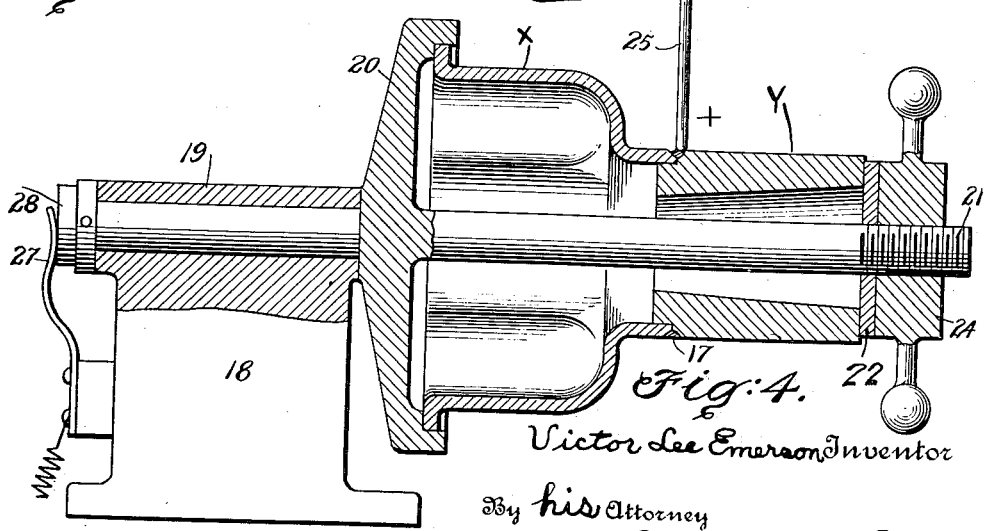

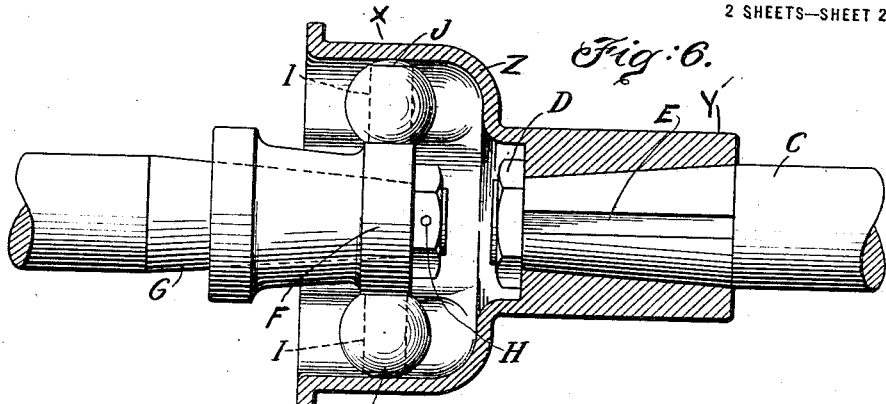
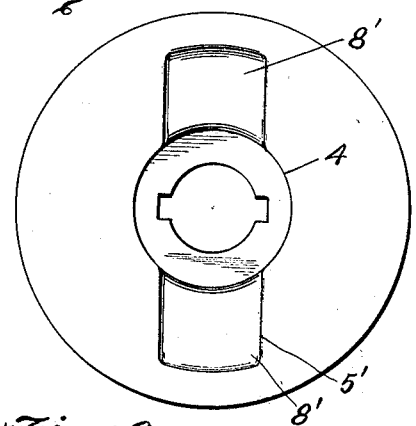
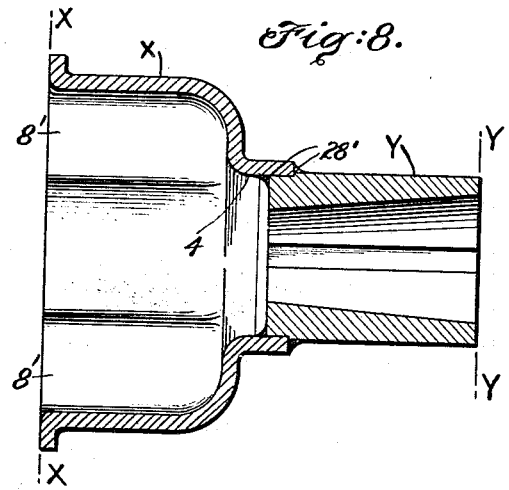
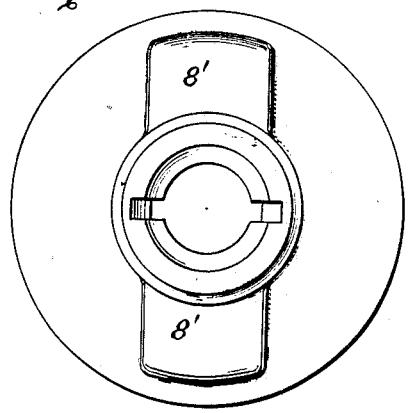
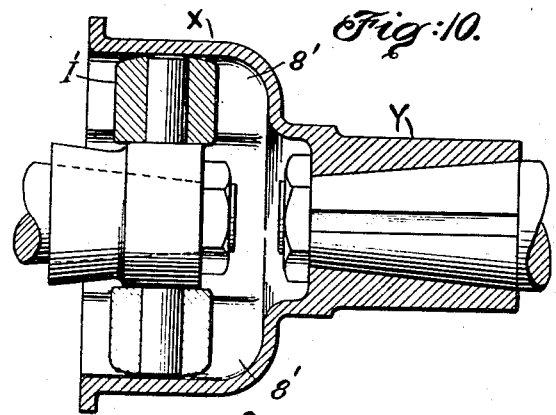

VICTOR LEE EMERSON, OF ALEXANDRIA, VIRGINIA.

MACHINE ELEMENT.

1,297,128.   Specification of Letters Patent.   Patented Mar. 11, 1919.

Application filed February 10, 1916. Serial No. 77,528.

*To all whom it may concern:*

Be it known that I, VICTOR LEE EMERSON, a citizen of the United States, residing at 21 Rosemont avenue, city of Alexandria, State of Virginia, have invented certain new and useful Improvements in Machine Elements, of which the following is a specification.

This invention relates broadly to the production of an article of manufacture for the purpose described by the employment of a process which combines methods of manufacture, which lend themselves to the production of a superior article in a more efficient, economical and cheaper way than has heretofore been produced.

In accordance with the above object and by way of example my invention may more specifically consist in forming one portion of a universal coupling of drawn sheet metal; machining another from bar stock and uniting the two by suitable means, such as welding, which enables each part to be treated so as to attain the desired qualities, which could not be done in an economical or practical manner with a single piece of material.

Another object of this invention is the production of an article of manufacture by uniting a hardened finished part to a soft workable part to produce an article of manufacture having a finished portion and a portion workable for fitting to the extent necessary to adapt it to the particular use for which it is intended.

A still further object of the present invention is the production of an article of manufacture for the purpose described, by drawing a shell from a portion of sheet metal, hardening the shell, grinding the same to produce finished surfaces, then turning a relatively heavy soft steel shank and uniting the hardened shell and the soft shank by the addition of metal to weld the shell and shank at their junction.

A still further and more specific object of this invention is the production of one member of a universal coupling by drawing an irregular shaped relatively thin shell portion, hardening the shell when drawn, grinding the hardened shell to size, producing a relatively heavy soft metal shank and then uniting the shell and shank by means of a flow of soft iron at the junction point of the shell and the shank.

A still further object of the present invention includes an article of manufacture comprising a hardened drawn metal shell finished to size integral with a turned soft metal shank adaptable for fitting necessary for the desired purpose.

In the usual construction the body piece is made from a forging and suitable openings are made by removing the stock by machining, which is much more expensive than if the body piece were drawn from sheet metal. The body piece is then subjected to heat treatment and hardened so that the wearing surface will be durable. In this treatment a certain amount of distortion takes place and owing to the hardness the following machining of the surface must be done by grinding, which also adds greatly to the cost of manufacture, whereas, if, as in the present invention, certain parts, in the course of manufacture, could be hardened which are subject to wear and other parts which are not subject to wear, such as the shank or hub which fits a shaft, could be reamed or broached and machined, then united with the hardened parts, the cost of manufacture would be greatly reduced.

In my invention the body piece is first drawn to the desired shape from sheet metal of practically uniform thickness, having a flange at one end to give structural stiffness and to provide against excessive warping during the heat treating. The flange also provides means whereby the body piece can be held in a suitable fixture for carrying out the various steps necessary in manufacturing. The great expense of machining from a solid portion is thereby avoided.

The hub or shank is made from a separate piece of bar stock, as a pressing made from sheet metal would not have sufficient thickness to form a proper hub and provide for broaching or key-seating. If the hub was drawn integral with the body the losses in the pressing operation would be great due to imperfect results, as the metal would crack in a draw of such great length. Besides various sizes and openings to fit a range of shafts in the hub portion is necessary, which would require very expensive dies to meet these various requirements.

My invention provides for machining the hub section from bar stock to the various dimensions required with allowances for finishing thereafter, then attaching this hub by suitable means to the body piece, which has been pressed from the sheet metal. It will be understood, that in my invention, heat treating and machining operations can be had to advantage on each piece separately.

The hub or shank is preferably joined with the body piece by welding. I prefer to employ electric welding as this type of welding permits the heat thereof to be confined locally to the part being welded, thus not affecting the heat treatment of the other parts, although it is of course understood that any other suitable method of welding may be employed. The general procedure is as follows:

To rough grind or turn the face and edge of the flange radially and at right angles to the center of the body, then heat treat and harden, then finish grind the face and edge of the flange true with a center of the bore so that the flange will serve as a part by which the other operations can be accomplished and the hub properly located concentric with the flange.

The flange also serves as a means to mount the body in a fixture which has surfaces thereon which mate with the ground surfaces of the flange in a manner to properly center the body so that the necessary operations can be performed upon the same with absolute accuracy.

The hub or shank is held concentric with the center of the bore in the body by retaining means, which is a part of the fixture and the hub or shank is then attached to the body preferably by electric welding at the point of junction between the shank and body piece, which welding follows a circular path as the body piece and shank are revolved. This avoids drawing the temper or hardness from the body piece or its working surfaces as the heat of the electric arc is localized at the welding point.

The hub being composed of a metal susceptible of machining is then reamed, turned and key-seated or slotted to the desired dimensions, thus saving the cost of grinding and at the same time leaving the body piece and its working surfaces hard. Thus is made a strong light structure at a greatly reduced cost and a great saving in equipment necessary to machine the parts from the solid. Also all the distortion that would accompany the heat treatment of the body piece in the forms shown is avoided and the likelihood of the body piece cracking where the heavy shank hub joins the body.

I have shown a preferable form of body piece and the way of attaching the hub and a modified form of both body piece and hub. Various changes are anticipated to meet the conditions in which the joints operate and the character of shaft, as to whether said shaft is tubular or solid, and I have indicated electrical welding as a preferable form owing to its producing the smallest amount of heat which would affect the parts.

Other and further objects of the present invention will in part be obvious and will in part be pointed out hereinafter in the specification following reference to the accompanying drawing forming a part of said specification and wherein like parts are represented by like characters throughout the several views thereof.

Heretofore in the art relating to devices of the character described it has been customary to form such devices of sufficiently heavy material to stand stresses and strains produced by heating the part which is to be fitted to external mechanism in order to soften the same, so that it will be in condition for the necessary machining, after the working parts have been finished and hardened. Parts produced in this manner are seldom true and require a considerable amount of fitting and reworking before such parts may be assembled properly. Also the production of parts by this method is very expensive since all races must be prepared by boring and grinding.

The above general statement applies specifically to the housing member of the coupling of the character disclosed in my United States Patent No. 1,085,855, granted February 3, 1914. Devices of this character are made up as stock parts, are sold in the open market particularly to automobile manufacturers who fit the shank of this housing to the particular type of shaft adopted by the manufacturer. In such cases the shank is taper bored to fit a tapering shaft; or in other cases key-ways of various types are cut in the shank. In order to accommodate these needs it becomes necessary for the working portion of the coupling to be finished accurately to size while at the same time the connecting or shank portion of the coupling is left soft and capable of being worked to provide the proper type of fitting.

By uniting a hardened finished drawn part to a soft turned part without unduly drawing the temper from the hardened part it will be seen that the desired article of manufacture is produced, at the same time economy is effected since the hollow portions of the device are made by the cheapest method, namely, drawing or forging and the solid portion is made by the economical method of machine tooling or cutting.

Referring particularly to the drawing, Figure 1 is the end view of the shell looking to the right in Fig. 2 on line x—x.

Fig. 2 is a cross section of the body member of the universal joint showing the method of welding taken on line of a—a of Fig. 1.

Fig. 3 is an end view of the joint on line y—y looking to the left in Fig. 2.

Fig. 4 shows the form of mechanism for centering and rotating the shank and drawn shell during the processes of welding.

Fig. 5 shows a section of the shell and shank welded and illustrates the electric welding taking place in a circular path.

Fig. 6 shows a cross section of the assembled joint.

Figs. 7, 8, 9 and 10 show a modification of the universal joint in which cylindrical rolls are used in place of balls and the races are squared in cross section in place of circular. These several views are taken in a similar manner to Figs. 1, 2, 3 and 6.

Referring now more particularly to the drawing the shell X is produced by drawing a cup 1 from a sheet of metal. The shell X is then hardened and ground to produce the housing with accurate surfaces as at 4, 5, 6 and 7, Fig. 2. The interior of the cup is cylindrical as is indicated at 4 in Figs. 2 and 8. A pair of cylindrical chambers 8 are provided adjacent the cylindrical portion 4 and the interior of the chamber is indicated by the surfaces 5 in Figs. 2 and 6. In order to provide an accurate plane surface on which the shell X may be set for adjustment the end surface 6 of the rim 9 is accurately ground to substantially a plane surface. The edge 7 of the rim 9 is also formed to accurate dimensions to enable the shell to be accurately centered in a chuck or otherwise which is desirable in making a fitting as will hereinafter be explained. The end of the cylindrical body portion 10 is preferably beveled as at 11. When the shell X has been hardened and the surface ground and formed as above specified the shell represents substantially a finished product.

As has been set forth it is extremely desirable that the shank be of soft workable steel and to this end a collar or shank Y is preferably produced by turning or otherwise to provide relatively heavy body walls through which extends an unfinished shaft opening 14. Preferably the edge of this soft steel shank may be reduced sufficiently to slightly enter the end of the shell (see Fig. 2) as at 15. Adjacent this reduced portion 15 the shank is chamfered as at 16 so that when the collar or shank Y is seated within the end of the shell X a groove 17 is provided adjacent the union of X and Y and preferably this groove is provided with a round bottom wall.

Various devices may be utilized to maintain the shank Y in the shell X and I have illustrated one type of device in Fig. 4. This device includes a frame 18 carrying a bearing 19 which supports a face plate 20 from which extends a threaded rod 21 on the outer end of which is provided a clamp washer 22 and hand nut 24. By this construction it will be noted that X and Y may be securely clamped together in such manner as to be rotated when in clamped relation.

To further carry out the construction of the member embodied in my invention, a soft iron pencil 25 may be mounted in an insulating handle 26 or other suitable device, and a suitable source of electricity which may be either a storage battery or a dynamo being connected to the parts X and Y through brush 27 and contact ring 28, and to the pencil 25, the pencil preferably having the positive end of the circuit connected thereto. As the soft iron pencil is touched in the bottom of the groove and slightly separated therefrom an electric arc is produced which melts away the soft pencil 25. If the parts X and Y are moved relative to the point of the pencil the melted iron from the pencil will gradually fill the groove 17 and produce a weld as at 28', Figs. 2 and 8, thereby uniting the soft steel shank with the hardened steel shell.

In the modification shown in Figs. 7, 8, 9 and 10 it will be noticed that the cylindrical rolls I' are used in place of balls and the races 8' are squared in cross section in place of circular.

In Fig. 8 there is no groove 17 as in Fig. 2 but the metal is built up against the edge of the shell as shown at 28'.

To give a full understanding of the practical use of the specified article of manufacture herein referred to, reference will be made to Fig. 6. The completed housing Z is illustrated as being secured upon a shaft C by means of a nut D, and a suitable key shown at E. This housing incloses a head F mounted upon a shaft G and secured by means of a pinned nut H. The head F carries on the shafts I anti-friction balls J which are constructed to accurately fit the cylindrical chambers 8 previously referred to.

Wherever the word "iron" is used in the specification and claims it has been used with reference to its general meaning to include a metal or composite metal of iron and its common alloys.

The present case is limited to an article of manufacture, the method of making the same forming the basis of applicant's copending application Serial No. 159,384, filed March 30, 1917.

The particular embodiment of my invention herein disclosed is, of course, susceptible of considerable variation without departing from the spirit thereof and it is to be understood that many changes might be made by those skilled in the art within the scope of the invention as defined by the appended claims.

What I claim is:

1. As an article of manufacture, a member of a universal coupling comprising a steel shell having a disk shaped rim portion, a cylindrical body portion extending from said rim portion, a pair of chambers one on each side of said body portion, and a soft steel shank integral with the end of said body portion.

2. As an article of manufacture, a member for a universal coupling, comprising a hardened steel shell having a disk shaped rim, a cylindrical body portion having an axis passing through substantially the center of said disk, chambers formed on diametrically opposite sides of said body portion, and a soft steel shank integral with said body portion.

3. As an article of manufacture, a member of a universal coupling, comprising a hollow housing having body walls of substantially uniform thickness and formed of hardened steel, said housing including a disk shaped rim, a substantially cylindrical body portion, and chambers connected with and adjacent to said body portion; and a soft steel shank integral with and extending beyond said body portion.

4. As an article of manufacture, a hardened steel shell of irregular cross-section, and having body walls of substantially uniform thickness; and a soft steel shank integral with and extending from said shell.

5. As an article of manufacture, a member of a universal coupling comprising a rotatable body formed from sheet metal of substantially uniform thickness with a flange projecting radially from one end and a reduced neck on the other end adapted to receive a driving or driven connection, said rotatable body having its walls formed into a plurality of chambers adapted to receive the ends of a second rotatable member and forming a torque transmitting connection between said rotatable body and member.

6. As an article of manufacture, a member of a universal coupling comprising a hardened rotatable body formed from sheet metal of substantially uniform thickness with a flange projecting radially from one end and a reduced neck on the other end adapted to receive a driving or driven connection, said rotatable body having its walls formed into a plurality of chambers adapted to receive the ends of a second rotatable member and forming a torque transmitting connection between said rotatable body and member.

7. As an article of manufacture, a member of a universal coupling comprising a rotatable body formed from sheet metal of substantially uniform thickness with a flange projecting radially from one end and a reduced neck on the other end adapted to receive a driving or driven connection, said rotatable body having its walls formed into a plurality of chambers adapted to receive the ends of a second rotatable member and forming a torque transmitting connection between said rotatable body and member, said chambers having walls substantially parallel with each other of equal distance from the line of axis terminating at their outer ends in radial walls, the radii of which extend to the axis, said chambers having a longitudinal depth sufficient to permit a longitudinal movement of said rotatable body and member with respect to each other.

8. As an article of manufacture, a member of a universal coupling comprising a rotatable body formed from sheet metal of substantially uniform thickness with a flange projecting radially from one end, said rotatable body having its walls formed into a plurality or chambers adapted to receive the ends of a second rotatable member and forming a torque transmitting connection between said rotatable body and member, said chambers having walls substantially parallel with each other of equal distance from the line of axis terminating at their outer ends in radial walls, the radii of which extend to the axis, said chambers having a longitudinal depth sufficient to permit a longitudinal movement of said rotatable body and member with respect to each other.

9. As an article of manufacture, a member of a universal coupling comprising a hardened steel coupling portion and a soft steel shank portion integral therewith.

In testimony whereof, I, VICTOR LEE EMERSON, have signed my name to this specification in the presence of two subscribing witnesses, this 5th day of Feb., 1916.

VICTOR LEE EMERSON.

Witnesses:
LAURENCE S. PADDOCK,
ANNETTE E. EMERSON.